May 22, 1956  J. T. BARRON ET AL  2,746,128
LOADING DEVICE FOR AUTOMATIC SCREW AND SIMILAR MACHINES
Filed March 15, 1950  10 Sheets-Sheet 1

May 22, 1956  J. T. BARRON ET AL  2,746,128
LOADING DEVICE FOR AUTOMATIC SCREW AND SIMILAR MACHINES
Filed March 15, 1950  10 Sheets-Sheet 2

Inventors:
James T. Barron
Joseph J. Dill
Joseph H. Hotelling
Maxwell Fish
Attorneys

Fig.15.

United States Patent Office 2,746,128
Patented May 22, 1956

2,746,128

LOADING DEVICE FOR AUTOMATIC SCREW AND SIMILAR MACHINES

James T. Barron, Joseph J. Dill, and Joseph H. Hotelling, Erie, Pa., assignors to Brown & Sharpe Manufacturing Company, a corporation of Rhode Island Application March 15, 1950, Serial No. 149,786

7 Claims. (Cl. 29—93)

The present invention relates to a loading device for automatic screw and similar machines for fashioning articles successively from bar stock of any description and more particularly to an improved loading mechanism adapted for feeding a new bar of stock into position in the machine upon the exhaustion of the previously feeding bar.

In a loading device for automatic screw and similar machines which is arranged for the storage of a number of bars which are to be located successively in alignment with and to be advanced into the work spindle of the machine as the previous bar is used up or is exhausted, it has been found desirable for the handling of bar stock which is of small diameter or which is other than round, to provide a separate support or barrel for each stored bar of stock. Preferably a storage magazine is employed which takes the form of a rotatable frame having a series of bar stock supporting barrels which may for example be closed tubes arranged in circular relation to be brought by indexing movement of the frame successively into alignment with the work spindle of the machine.

It is an object of the invention to provide a novel and improved loading device including a multiple barrel magazine and a pusher device for advancing bar stock from an aligned barrel into the work spindle of the machine which is well adapted for automatic operation to select and to position successive bars of stock in the work spindle as the bar being worked in the machine becomes exhausted in order to maintain a fully automatic operation of the machine.

More specifically it is an object of the invention to provide in a magazine loading device of the class described a novel construction and arrangement of the operating and controlling devices for initiating and for carrying out the several operations required for the automatic loading of the machine.

It is a further object of the invention to provide a novel system of pneumatic and electrical actuating and control devices which is particularly well adapted for carrying out the several operations associated with the automatic selection and loading of successive bars into the machine.

With these and other objects in view as may hereinafter appear, a feature of the invention consists in the provision of a loading device, including a rotatable multiple barrel magazine, a stock pusher device, and actuating and control devices rendered operative upon the exhaustion of a bar of stock being worked in the machine to automatically position and feed a new bar into the machine.

Other features of the invention relate to novel constructions and arrangements of pneumatic and electrical actuating and control devices in a magazine type loading device which are rendered operative upon the exhaustion of a feeding bar to perform a number of operations which may include the conditioning of the machine to receive a new bar, the indexing of the magazine to bring another barrel into a position of alignment with the work spindle of the machine, the feeding of a new bar into the machine, the conditioning of the screw machine for the resumption of operation, and the return of the parts of the loading device to their initial starting position.

Another feature of the invention consists in the arrangement of a main and a compensating feeding device for advancing a stock bar feed member and control devices associated therewith for causing the leading end of the new bar to be projected a measured distance into a predetermined operating position in the work spindle of the machine.

Other features of the invention relate to the provision of a pneumatically operated bar stock loading and feeding device including a pneumatically operated flexible pusher cable adapted for feeding successive portions of a feeding bar of stock to the stock stop and operating tools of an automatic machine, and actuating and control devices for selecting and feeding successive bars of stock to maintain automatic operation of the machine.

Another feature of the invention consists in the provision of a fully automatic reel loading mechanism which is arranged to be rendered operative with each indexing movement of the magazine to feed from a storage reel into a barrel of the magazine, and to cut off a length of bar stock.

With the several objects in view as above noted, the several features of the invention consist also in the devices, combinations, and arrangement of parts hereinafter described and claimed which together with the advantages to be obtained thereby will be readily understood by one skilled in the art from the following description taken in connection with the accompanying drawings, in which

The rotatable magazine type loading device which is herein disclosed as embodying in a preferred form the several features of the invention is particularly illustrated as applied to an automatic screw machine of the general type, and having the fixed spindle, stock feeding mechanism, stock stop, and machine starting and stopping clutch lever, shown in the United States patent to Rich, No. 1,877,693, dated September 13, 1932.

Referring more specifically to the drawings, Figs. 1 to 3, 6 to 8, 11, and 15 illustrate one form of the invention in which there is shown in combination with a rotatable bar stock magazine, a pusher rod, a pneumatically operated piston to which the pusher rod is attached, a supporting cylinder, and a slide on which the entire piston and cylinder unit is movable, and a second pneumatically operated piston connected to move the slide. An operating and control system is provided for selectively controlling the operation of the two pusher actuating pistons so that one of the pistons is caused to advance the pusher rod and a new bar of stock actuated thereby until the leading end of the bar reaches a predetermined position. Thereafter the active piston is stopped and the other piston is actuated to advance the leading end of the new bar a predetermined further distance into operating position in the work spindle of the machine. In this manner adjustment is made automatically for any variations in length of the new bar and the leading end of the bar is then moved exactly to the desired operative position in which it may project slightly from the feed tube in position for a preliminary cutting-off operation as the machine is started.

Figure 1:
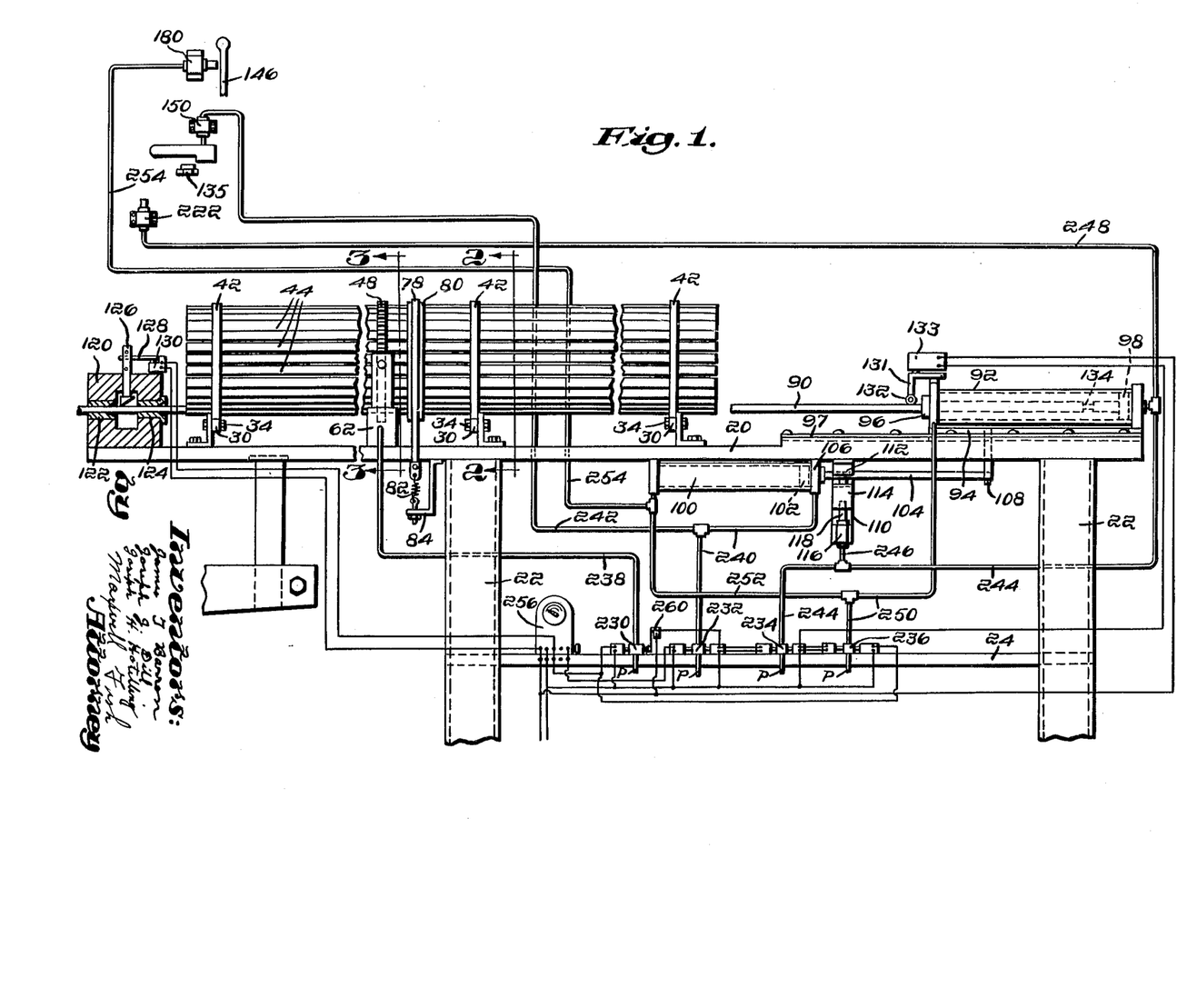
Fig. 1 is a view in side elevation of a loading device embodying in a preferred form the several features of the invention, with some parts broken away and others shown in diagrammatic form for convenience of illustration.
Figure 2:
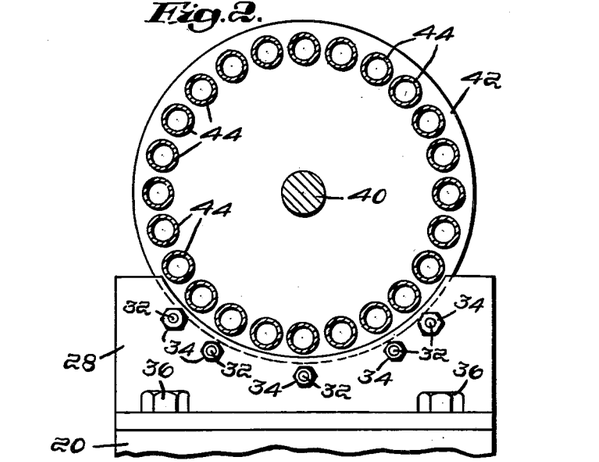
Fig. 2 is a sectional view taken on a line 2—2 of Fig. 1.

Further operations which are performed by the loading device of Fig. 1 include the rotating of the magazine to position a new barrel in alignment with the work spindle when the trailing end of the old bar passes out of its supporting barrel into the work spindle, and the actuation of an electric timer which acts after a predetermined interval to lock the stock stop out of operation, to stop the machine with the work-gripping collet open, and to start the feed of a new bar.

As best shown in Fig. 1 the loading device comprises a supporting table 20 having legs 22 and connecting brace members 24. Spaced arcuate shaped cradles are mounted on the table 20. The cradles (see Fig. 2) comprise angle plates 28, having transversely spaced bearing rollers 30 carried on pivot pins 32 mounted on the angle plates 28 and secured in position by nuts 34. The base portions of the angle plates 28 are secured to the table 20 by means of screw bolts 36. One side of the track provided by each set of rollers 30 is bounded by the upwardly projecting edge of the associated plate 28. The rollers 30 associated with the plates 28 supporting one end of the magazine are arranged to face in the opposite direction from the rollers 30 associated with the plates 28 toward the other end of the magazine so that endwise support is provided for the magazine by said edges in both directions.

The loading magazine for bar stock provided in accordance with the invention comprises a longitudinally extending central supporting shaft 40 on which are mounted a series of circular discs 42, one being provided to ride in each of the cradles 28. The several discs are apertured to provide support for a series of longitudinally extending bar stock supporting barrels 44 which take the form of cylindrical tubes in the present disclosure. Open, or U-shaped tubes, with a properly provided "fence," might be used, however. As shown for example in Figs. 1, 2, and 3 the tubes are supported in a circular relation about the pivot shaft 40, and are spaced equal distances from one another so that they may be brought by successive indexing movements of the magazine, into alignment with the feed tube of the screw machine to which the loading device has been applied. The work supporting spindle with which the bottom barrel of the magazine is aligned is indicated at 46 in Figs. 6 and 11.

Figure 3:
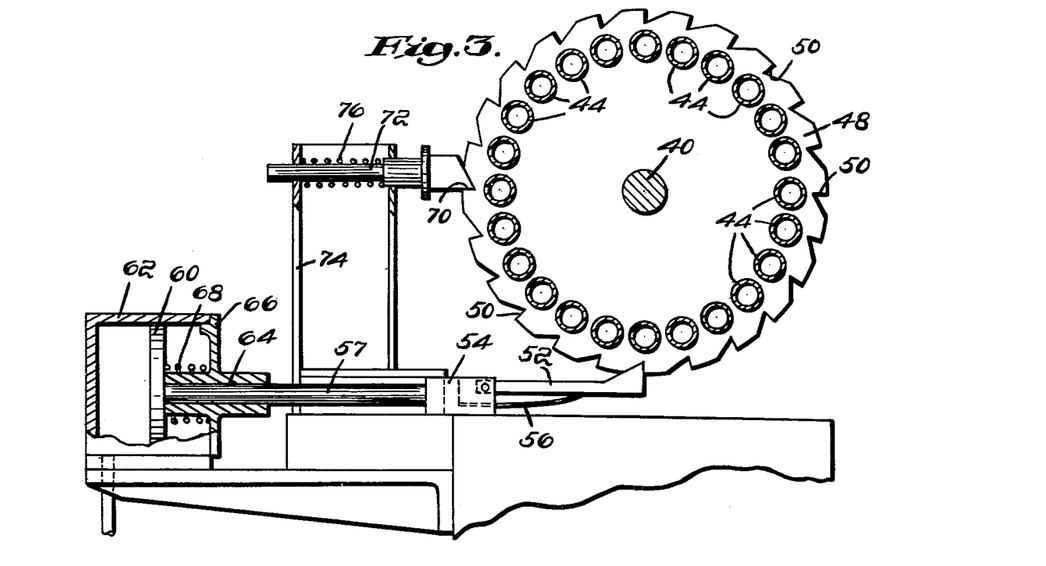
Fig. 3 is a sectional view taken on a line 3—3 of Fig. 1 to illustrate particularly the mechanism for rotating the bar stock magazine to successively indexed positions.

Mechanism is provided for imparting successive increments of rotational indexing movement to the bar stock magazine to bring the barrels 44 successively into alignment with the work spindle 46 of the machine. This mechanism, as best shown in Figs. 1 and 3, comprises a disc 48 mounted on the supporting shaft 40 intermediate its length, apertured to receive the barrels 44 and having formed in the periphery thereof ratchet teeth 50. A horizontally disposed pawl 52 pivotally mounted on a sliding member 54 is held by means of a leaf spring 56 yieldably in engagement with the ratchet teeth 50. Sliding member 54 is provided with a cylindrical extension 57 which is connected at its further end to a compressed air actuated piston 60 slidably supported in a cylinder 62. The cylindrical extension 57 passes through a bearing sleeve 64 formed in the end cap 66 of the cylinder 62. A compression spring 68 coiled about the sleeve 64 between the end cap 66 and piston 60 tends to maintain the piston and pawl 52 actuated thereby normally in a retracted position. The magazine is held in each successive indexed position by means of a horizontally disposed locking pawl 70 having a cylindrical shank portion 72 thereof slidably supported in an upwardly extending bracket 74. The locking pawl is held yieldably in an advanced ratchet engaging position by means of a compression spring 76 coiled about the cylindrical shank 72 and arranged to abut at one end against the bracket and at its other end against an abutting shoulder on the pawl shank 72. The rotational movement of the magazine under the influence of its indexing pawl 52 is further controlled by means of a braking device which may be of ordinary description and which, as generally shown in Fig. 1, comprises a strap 78 which passes around a drum surface 80 extending around the periphery of the magazine. The brake strap 78 in accordance with the usual practice, is fixedly anchored at one end to the table 20 my means of a fastener, not shown, and at its other end is connected to a tensioning spring 82 supported from a depending bracket 84 on the table 20.

In the embodiment of the invention specifically shown in Fig. 1 of the drawings, the mechanism for advancing a bar of stock stored in the aligned barrel 44 of the magazine into operating position in the work spindle of the screw machine comprises a pusher rod 90 which is supported in alignment with the work spindle 46 and intervening aligned barrel 44 forming an air operated cylinder and piston unit 92. This unit, as best shown in Fig. 1, comprises the cylinder 92 which is mounted on a slide member 94 carried in ways 97 on the table 20. The pusher rod 90 is journaled in a bearing formed in the head 96 of the cylinder 92 and is connected to a piston 98 slidable in the cylinder. The cylinder and piston unit 92 is arranged to be moved longitudinally on the guideway 97 by means of a second compensating cylinder and piston unit 100 which is mounted beneath the table 20. This unit consists specifically of the cylinder 100, a piston 102 slidable therein, and a piston rod 104 which extends through one of the heads 106 of the piston 100 and at its outer end is connected by means of the bracket 108 with the slide 94. A feature of the invention as shown in the embodiment of Fig. 1 consists in the provision of a clamping device which is rendered operative when the pusher 90 has been advanced to an indicated position through the operation of piston 102 to clamp these parts including piston 102, rod 104, and cylinder 92 of the main cylinder and piston unit in a fixed position. The clamping device as indicated in Fig. 1 preferably consists of a vertically disposed bracket 110, a stationary clamping member 112 fixed to the bracket 110 and overlying the piston rod 104 and a movable clamping element 114 arranged for engagement against the underside of the piston rod 104. Movement of the clamping member 114 is controlled by means of an air actuated cylinder and piston unit 116 consisting of the cylinder 116 secured to the bracket 110 and an associated piston rod 118 which is secured at its upper end to the movable clamping member 114.

As shown in Fig. 1, there is provided between the bar stock magazine and the work spindle 46 a detector device which takes the form of a supporting block 120 mounted on the table 20 and providing support for two aligned bar stock guiding bushings 122 and 124, spaced from one another and providing an aperture therebetween in which is mounted a detector element 126. This element takes the form of a vertically disposed plunger slidably supported in the block 120 and connected at its upper end to the actuating arm 128 of a microswitch 130. The rearwardly disposed face of the detector element 126 is cammed so that engagement of the leading end of a feeding bar therewith will cause the detector member 126 to be moved to the raised position shown in Fig. 1. Passage of the trailing end of the old bar on the other hand will allow the detector member to drop, thus moving the microswitch 130 to an alternate position.

There is also provided, as shown in Fig. 1, a feed limit detector device which is utilized to condition the several actuating and control mechanisms hereinafter to be described for the return of the parts of the loading device to their starting position upon completion of the feed of a new bar of stock into the work spindle of the screw machine. This device comprises a pivoted L-shaped detector arm 131 which carries a roller 132 adapted for engagement with the pusher rod 90 and which is adapted to control the position of the operating contact of a microswitch 133. Movement of the pusher rod 90 to an extreme projected position with relation to the cylinder 92 causes the roller 132 to engage in an annular groove 134 in the pusher rod, thus permitting the L-shaped detector lever 131 to drop, and thus to actuate the microswitch 133.

Figure 6:
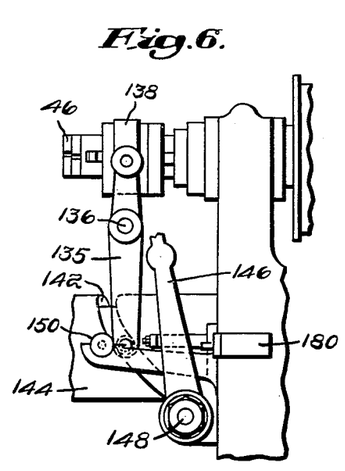
Fig. 6 is a fragmentary view in elevation of the work spindle of an automatic screw machine, the feed lever and cam, the machine main clutch lever, and parts of a power connection for shifting the lever to stop position.
Figure 7:
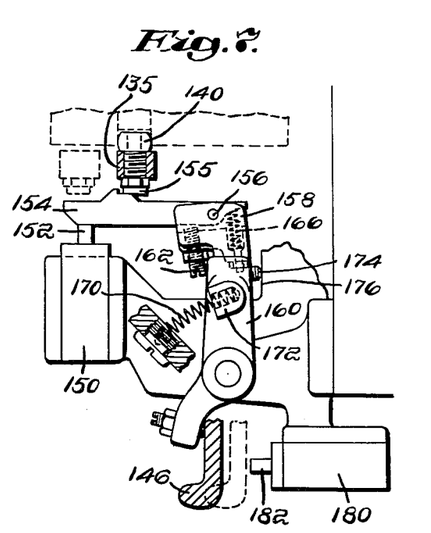
Fig. 7 is a plan view partly in section and on an enlarged scale of the mechanism shown in part in Fig. 6.
Figure 8:
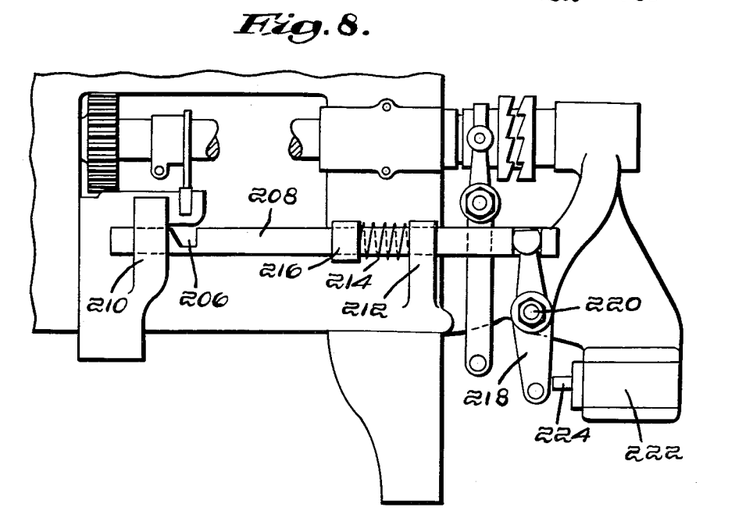
Fig. 8 is a fragmentary view in elevation of a mechanism for rendering the stock stop of the machine inoperative.

Certain features of the invention as illustrated in the embodiments of Figs. 1 to 8, inclusive, 11, and 15 of the drawings relate to the provision of a compressed air operated device for moving the main clutch lever of the screw machine to its stop position to stop the machine with the work-gripping collet open, the provision of a compressed air operated device to support the stock stop in an inoperative position in which it is out of alignment with the feed spindle, and the provision of another compressed air operated device which is rendered operative when a new bar of stock has been placed in operating position to shift the main clutch lever of the screw machine again to its operating position. Figs. 6 and 7 of the drawings contain a disclosure of the feed cam and feed lever and the main clutch lever of an automatic screw machine, which parts are similar to corresponding parts illustrated in the United States patent to Rich, No. 1,877,693. The parts of the screw machine shown include specifically the work spindle 46, a feed lever 135 and a main clutch lever 146. The feed lever 135 is supported to turn on a pivot 136 and at its upper end is connected to a feed sleeve 138 on the spindle 46. At its lower end the feed lever 135 carries a cam follower roller 140 which is engaged in a feed cam groove 142 in a continuously rotating cylindrical cam 144. The main clutch lever 146 is secured to a rock shaft 148. The lever is movable from the running position shown in Fig. 6 to an alternative position to the right as indicated in dotted lines in Fig. 7, in which the machine is stopped in a normal manner.

The mechanism illustrated in Figs. 6 and 7 for moving the main clutch lever 146 to its stop position consists of a compressed air cylinder 150 and plunger 152, and a latch arm 154, which is arranged to be moved by the plunger 152 into the path of movement of the feed lever 135 and of an abutment 155 thereon so that the latch arm 154 is then moved positively in a longitudinal direction to move the feed lever to the stop position shown in dotted lines in Fig. 7. The latch arm 154 is pivotally mounted at 156 on an extension 158 of an actuating lever 160. A stop screw 162 on the extension 158 is arranged to engage the latch arm 154 to limit its movement in a counterclockwise direction in a position in which the notched outer surface there is out of engagement with the reciprocating abutment 155 on the feed lever 135. The latch arm 154 is normally held in this inoperative position by means of a small compression spring 166 which engages a portion of the latch arm to the right of its pivot 156. A coiled compression spring 170 seated at one end on a portion of a machine frame and at its other end in an aperture 172 formed on the actuating lever 160 acts normally to maintain the lever 160 in its inoperative position in which a stop screw 174 thereon engages a fixed abutment 176 of the machine. When compressed air is supplied to the cylinder 150, forward movement of the plunger 152 causes the latch arm 154 to be moved into the path of the reciprocating abutment 155 so that as this element moves to the right the latch will be pushed into its operating position, as shown in Fig. 7. During the next normal feeding movement of the feed lever 135 to the left to the dotted position shown in Fig. 7, the abutment 155 and latch arm 154 moving therewith will rock the actuating lever 160 to move the starting and stopping lever 146 to the dotted position of that lever shown in Fig. 7. The machine will thereupon be completely stopped, except for the rotation of the work spindle. The work-gripping collet will not have closed in the work cycle. However, the usual feeding stroke of the machine feeding mechanism will have already taken place, but with insufficient stock length in the work spindle to make another piece, and the machine will therefore be conditioned for ejecting the waste end of the old bar and for gripping and cutting off the raw end of the new bar immediately upon restarting the machine in the manner to be described. When the compressed air is released from piston 150, the piston 152 retracts and latch 154 under the influence of its spring 166 also moves to its inoperative position. The actuating lever 160 is returned to the position shown in Fig. 7 by the action of its spring 170.

The mechanism for again starting the machine comprises a compressed air cylinder 180 and associated piston 182 which acts when projected to engage with and move the feed lever 146 to the left from the dotted to the full line position shown in Fig. 7.

Another feature of applicants' construction consists of a provision of a compressed air actuated control for holding the stock stop of the machine out of operation to permit the ejection of the waste end of the old bar and the positioning of the leading end of the new bar in operating position in the work spindle of the machine. The stock stop of the machine, together with the actuating connections therefor are in general similar to those illustrated in the patent to Rich above referred to. The stock stop is indicated at 184 in Fig. 11 secured to a rock shaft 186, having a rack and pinion connection 188 with a link 190 which, at its lower end, is pivotally connected to a cam follower lever 192. A cam roller 194 on the lever 192 is arranged for engagement with an operating cam 196 on a cam shaft 198 forming a usual part of the screw machine. The cam follower lever 192 is pivotally supported to turn about a fixed pivot 200 and is normally maintained by a spring 202 in a raised position in which the operation of the stock stop is controlled by the contour of its cam 196. A tail 204 of the cam lever 192 is arranged normally for movement into and out of a slot 206 (see Fig. 8) formed in a longitudinally extending control rod 208 slidable in bearing brackets 210 and 212 on the machine. Movement of the control rod 208 to the right so that the slot 206 is out of alignment with the tail 204 causes the tail to engage against the control rod 208 and thus to hold the stock stop in a partly raised position out of alignment with the work spindle 46. A compression spring 214 coiled about the control rod 208 between a collar 216 fixed on the rod and the bearing bracket 212 tends normally to maintain the control rod in a position to the left in which the slot 206 is aligned with the tail of the cam lever 204. For shifting the control rod 208 to render the stock stop inoperative, there is provided a downwardly extending lever 218 supported to turn on a pivot 220 and at its upper end connected to the control rod 208. At its lower end the lever 218 is arranged to be acted upon by a compressed air cylinder 222 and associated piston 224 which acts when compressed air is supplied to the cylinder to rock the lever 218 in a clockwise direction from the position shown in Fig. 8 and thus to move the slot 200 out of alignment with the tail of the stock stop actuating cam lever 192 so that the stock stop is blocked in a raised position.

Figures 4, 5:
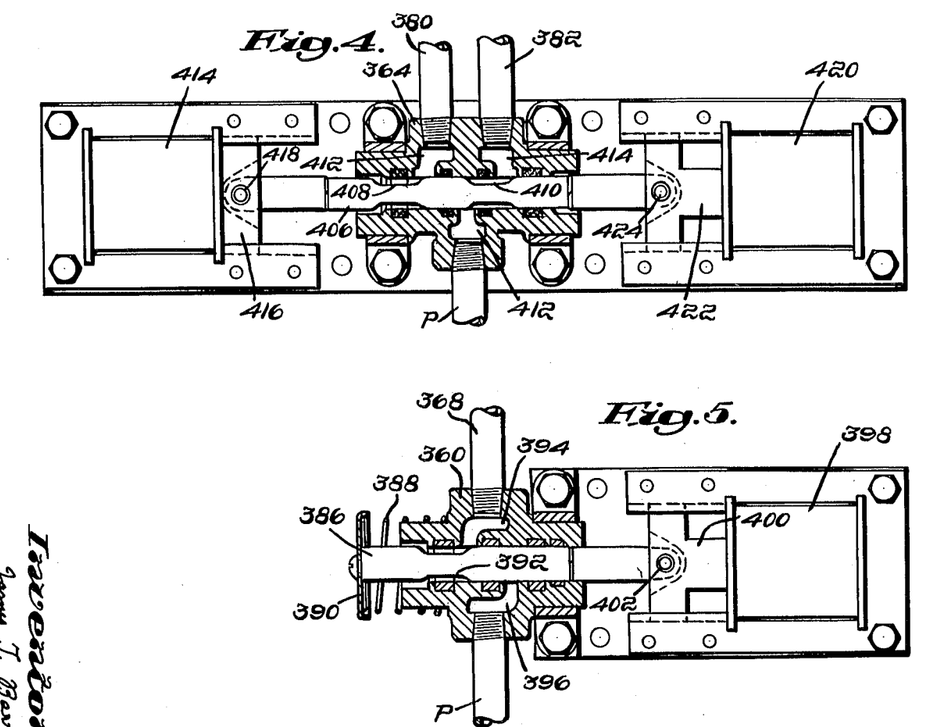
Fig. 4 is a detail view partly in section of a four-way air valve controlled by two solenoids shown diagrammatically in Fig. 9.
Fig. 5 is a detail view partly in section of a three-way air valve controlled by one solenoid shown diagrammatically in Fig. 9.
Figure 15:
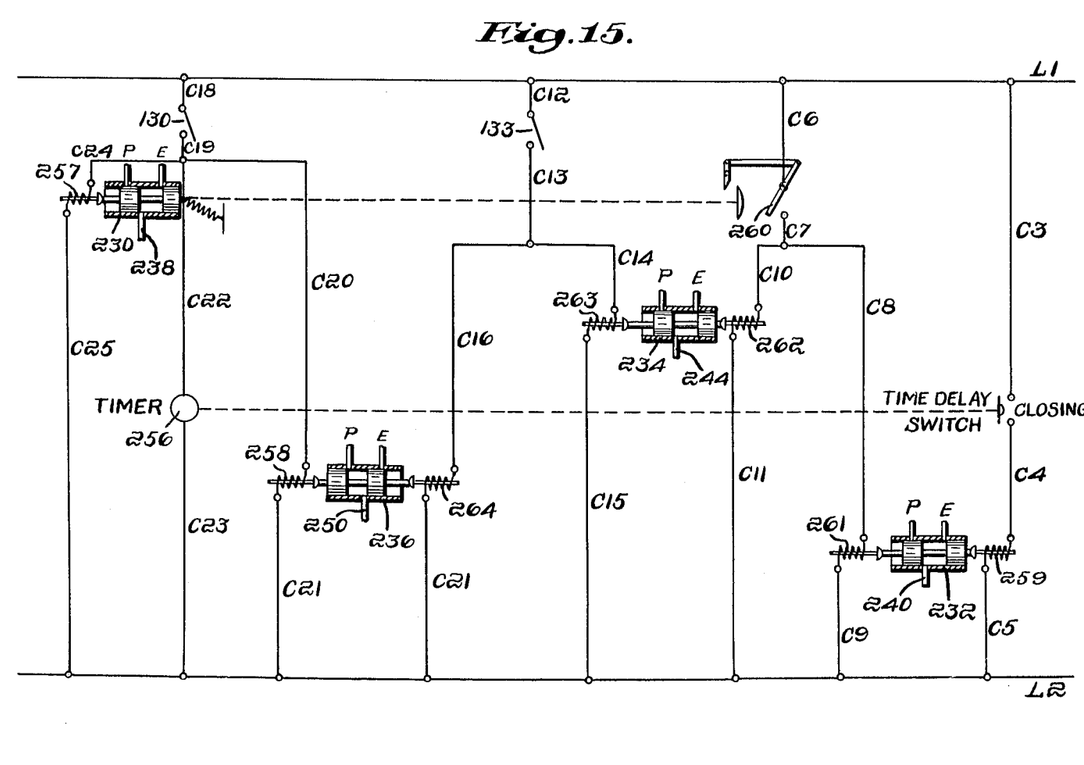
Fig. 15 is an elementary wiring diagram of the electrical connections shown in Fig. 1.

The flow of compressed air to each of the compressed air cylinder and piston units above described is controlled by means of a group of four solenoid operated compressed air valves shown diagrammatically in Fig. 1 and in somewhat greater detail in the wiring diagram, Fig. 15. The three-way valve shown in Fig. 5 and hereinafter described is similar to these valves except that the valve of Fig. 5 is adapted to be operated by a single solenoid only. The compressed air valves mounted on the brace member 24 include a single solenoid control three-way valve 230 and three two-solenoid controlled three-way valves designated respectively at 232, 234, and 236. Compressed air is supplied to each of these valves through a compressed air supply line designated by the letter P. The valve 230 is connected by means of a pipe 238 to the magazine indexing cylinder 62. Air valve 232 is connected by a pipe line 240 to the base end of compensating cylinder 100 and through a branch line 242 to the main clutch lever stop compressed air cylinder 150. Compressed air valve 234 is connected by means of a pipe 244 to the base end of the pusher feed cylinder 92, and through an extension 246 to the clamp cylinder 116. Compressed air valve 236 is connected by means of a pipe 250 to the leading end of the pusher feed cylinder 92, and through an extension 252 to the leading end of the compensating feed cylinder 100 and further through an extension 254 to the main clutch lever start compressed air cylinder 180.

There is also mounted on the brace member 24 an electrical timing device 256 which acts after the lapse of a predetermined time interval after the passing of the trailing end of the old bar feeding in the machine to initiate automatically the number of operations which will now be more specifically set forth. The arrangement of the electrical wiring which connects the detector actuated switches, electrical timing device and the several compressed air operated solenoids will be evident from the following description taken in connection with Fig. 1 and also in connection with the accompanying elementary wiring diagram of these connections, Fig. 15.

The operation of the magazine loading device above described and illustrated in Figs. 1 to 8, 11, and 15 is as follows: Assuming that the several barrels 44 of the magazine are loaded with bar stock and that the machine is in operation, the passing of the trailing end of an old bar of stock being worked in the work spindle of the machine causes the detector element 126 to drop, activating microswitch 130, which in turn acts to start an indexing movement of the bar stock magazine to position a new barrel in alignment with the work spindle, to start the operation of the electrical timer and to cause air to be exhausted from the leading ends of the feed cylinder 92 and the compensating cylinder 100 and from the screw machine start cylinder 180.

These operations initiated by the dropping movement of detector element 126 are accomplished as follows: The activating of microswitch 130 closes the microswitch contacts $c18$ and $c19$ shown in Fig. 15 which energizes a solenoid 257, shifting the three-way compressed air valve 230 to its "on" position so that compressed air is admitted through pipe line 238 to the indexing cylinder 62 to impart an indexing movement to the magazine. The closing of the microswitch contact $c18$—$c19$ also energizes the timer 256 and energizes a solenoid 258 which causes three-way compressed air valve 236 to be moved to its exhaust position in which compressed air is exhausted from the leading end of the feed cylinder 92 to pipe 250, from the leading end of the compensating cylinder 100 through pipe 252 and from the screw machine start cylinder 180 through pipe 254.

When the timer 256 reaches the end of its time cycle it operates to start the feed stroke of the compensating cylinder and piston unit and at the same time to shift the main clutch lever 146 of the screw machine to its stop position. In the machine shown the operation of the screw machine stop motion is such as to stop the machine in a predetermined position in which the stock stop will normally be located in position to arrest the advance of a feeding bar.

In order to perform the several operations noted the timer 256 acts at the end of an adjusted time interval to close switch contacts $c3$—$c4$ (see Fig. 15) thus energizing a solenoid 259 which causes the compressed air valve 232 to be shifted to its open position. Compressed air now passes through pipe 240 to the base end of the compensating cylinder 100 to start the feeding stroke of piston 102 to advance the pusher rod 90 into the aligned barrel 44. Compressed air also passes through the branch pipe 242 to the compressed air cylinder 150 which causes latch arm 154 to be engaged with the abutment 155 of the screw machine feed lever so that the main clutch lever 146 of the screw machine is now moved by power to its stop position.

When the leading end of the new bar being pushed forward by the action of compressed air cylinder 100, piston 102, and pusher rod 90 reaches a position in which the leading end of the bar is about to enter the work spindle of the screw machine, it engages with and raises the detector element 126, which has the effect of arresting the feeding movement of the compensating piston 102, of clamping the piston 102 and associated parts including the main feed cylinder 92 in a fixed position, and of starting the feed movement of the piston 98 with relation to its cylinder 92. At the same time the stop stock of the machine is moved to a position in which it is out of alignment with the feed spindle in order to permit the ejection of the waste end of bar stock from the machine.

As shown in Figs. 1 and 15, the raising of the detector element 126 causes microswitch 130 comprising contacts $c18$—$c19$, to be opened so that solenoid 257 is de-energized, permitting the indexing compressed air control valve 230 to be returned under the influence of its spring to the exhaust position. The timer is de-energized. At the same time the solenoid 258 is de-energized but without any immediate effect. Movement of valve 230 to its "off" position causes a microswitch 260 comprising contacts $c6$—$c7$ to be momentarily closed. The microswitch 260 is constructed and arranged so that it is activated only by the return movement of the valve 230 to its "off" position, but is not effected by the preceding movement of the valve 230 to its "on" position.

The closing of the microswitch 260 supplies current to a solenoid 261 associated with a compressed air valve 232 and to a solenoid 262 associated with the compressed air valve 234. The impulse imparted to solenoid 261 is sufficient to shift the compressed air valve 232 to its "off" position, in which air is exhausted from the base end of the compensating cylinder 100 to prepare for the return of the piston to a starting position and in which air is exhausted from the screw machine stop compressed air cylinder 150. The energizing of solenoid 262 causes the three-way compressed air valve 234 to be shifted to its open position so that compressed air is supplied through pipe line 244 to the base end of the main pusher feed cylinder 92 to start a measured advancing movement of the pusher feed piston 98. Compressed air is supplied through pipe extension 246 to the compressed air cylinder 116 in order to engage the clamp 114 so that the pusher compensating piston 102 and cylinder 92 are held against further movement and is supplied through extension 248 to the compressed air cylinder 222 which operates to move the stock stop to an out-of-line position in order to permit the ejection of the waste end of bar stock from the machine. From the position in which the leading end of the new bar is engaged by the indicator member 126 the new bar of stock is now advanced by the pusher rod 90 through an exactly predetermined distance which is measured by the distance of advance of the pusher rod 90 and its operating piston 98 with relation to the cylinder 92.

When the pusher rod 90 reaches the end of its measured advancing movement, roller 132 of the L-shaped detector arm 131 drops into a notch 134 in the pusher rod which acts to release the stock stop so that it can return to active operation, to disengage the clamp for the compensating piston and to return the compensating and main pusher feed pistons together with the pusher 90 to their retracted inoperative positions of Fig. 1, and to shift the main clutch lever 146 of the machine back to its running position.

The operations referred to are initiated by the actuation of detector arm 131 as follows: Microswitch 133 is closed, supplying current to a solenoid 263 in order to shift the three-way compressed air valve 234 back to its exhaust position, thus connecting to exhaust the right hand end or base end of feed cylinder 92, and the clamp cylinder 116, and the stock stop throw-out compressed air cylinder 222. The closing of microswitch 133 also acts to energize a solenoid 264, which causes the three-way compressed air valve 236 to be shifted to its operating position. Compressed air is now forced through valve 236 and pipe line 250 to the leading end of the feed cylinder 92 and through extension 252 to the leading end of compensating cylinder 100 so that the feed piston 98 and compensating piston 102 are returned to their fully retracted positions to the right and the pusher rod 90 is returned to the position shown in Fig. 1 in which it is fully withdrawn from the aligned barrel 44. At the same time compressed air is supplied through extension 254 to the compressed air cylinder 180, causing the machine main clutch lever 146 to be shifted to its running position. Upon the start of the return movement of the pusher rod 90 with relation to its cylinder 92 the roll 132 rides out of the annular groove 134, thus causing microswitch 133 to be again opened, de-energizing the solenoid 264. This completes the cycle of operation in which the loading device has been rendered operative by the passage of the trailing end of the old bar into the work spindle of the automatic screw machine to effect an indexing movement of the bar stock magazine, the feeding of a new bar into operative position in the machine with the ejection of the waste end of the old bar from the work spindle, and the return of the several operating parts of the loading device to their initial starting positions.

Figs. 9, 10, 12, 13, and 16 of the drawings illustrate particularly a modified form of a magazine loading device for an automatic screw or similar machine. Inasmuch as the loading device here disclosed is identical with that previously described, except for changes hereinafter specifically referred to, the parts of this mechanism have been shown in diagrammatic form wherever possible in order to simplify the drawings. In this form of the invention a flexible cable pusher device is employed which is made of sufficient length to permit the pusher to be projected through an aligned barrel of the bar stock magazine and thence substantially through the length of the work spindle of the machine being loaded, so that the pusher follows the feeding bar of stock to the point of complete exhaustion of the bar and then only is returned to its initial starting position.

Figures 9, 10:
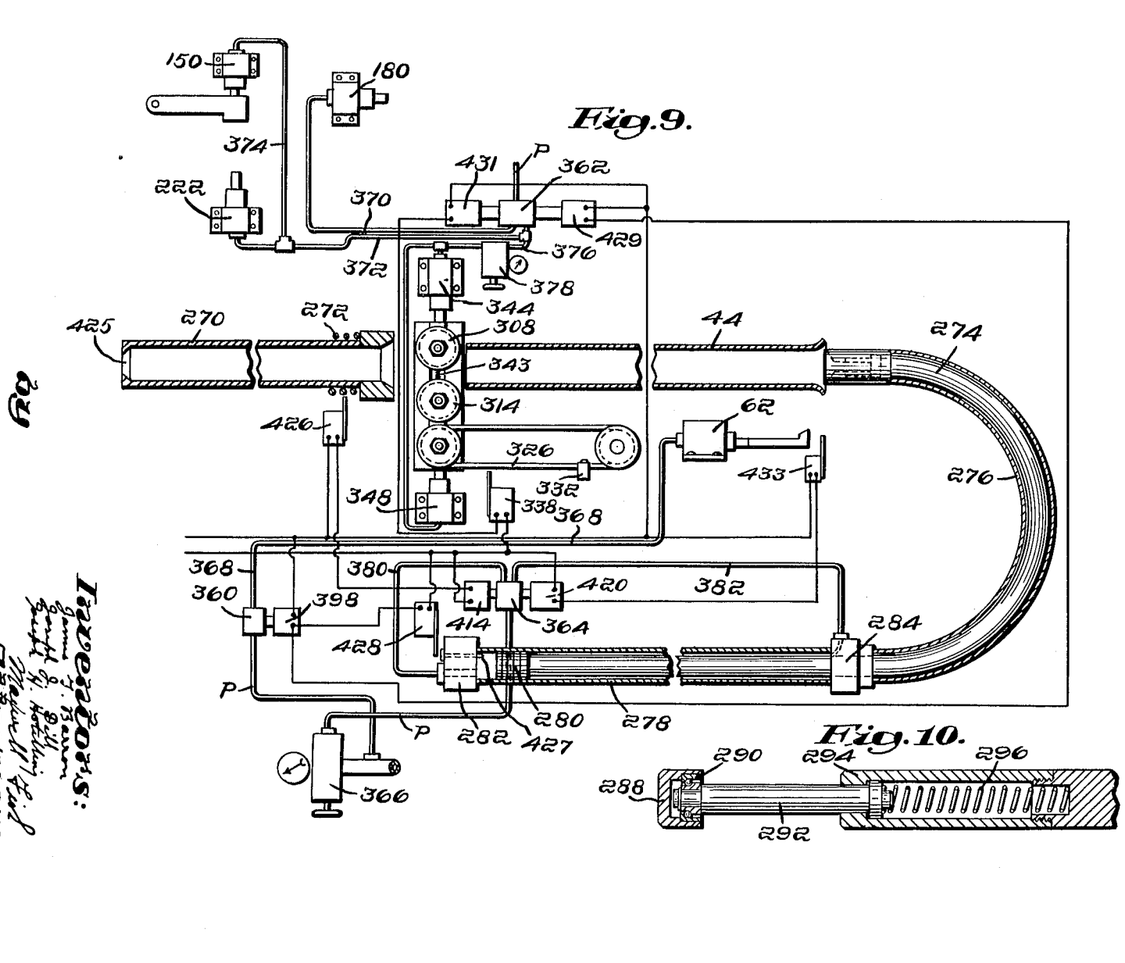
Fig. 9 is a diagrammatic view with certain parts shown in section of a modified form of pusher device including a flexible cable pusher member, and air valves and electrical controls for operating the pusher device in accordance with an automatic cycle.
Fig. 10 is a detail sectional view of the operating head for the pusher member shown in Fig. 9.

In accordance with the invention the flexible cable pusher, projected by compressed air, is here utilized in place of the usual feed fingers of the screw machine to impart the usual stepped feeding movements to the bar stock against the stock stop after the cutting off of each successively fashioned article. For use with this embodiment of the invention, therefore, the screw machine of the Rich patent above referred to has been modified to the extent that the usual feed fingers are removed and the feed tube without feed fingers, shown in Fig. 9, is employed. The usual feed lever of the screw machine is retained in order to provide a convenient power source for shifting the main clutch lever to the stop position.

Further in accordance with the invention the flexible pusher device employed is particularly adapted to provide for a compact construction in which a minimum length of floor space may be required to accommodate the machine, the major portion of the length of the pusher and of the actuating mechanism therefor being located to one side of and parallel to the stock magazine.

Referring specifically to Figs. 9 and 10, a feed tube 270 without fingers is shown adapted to be incorporated as an integral part of the feed spindle of an automatic screw machine in place of the usual feed assembly including feed fingers. The feed tube 270 is supported in the machine in such a manner as to permit of a slight axial movement of the feed tube from its normal operating position being normally maintained in a relatively retracted operating position to the right by means of a coiled spring 272. A barrel 44 of the bar stock magazine is shown in a position of alignment with the screw machine feed tube 270.

The flexible pusher cable referred to is designated at 274 and is carried in a supporting sheath or tube 276 of which the leading end is located in alignment with the feed tube 270 and aligned bar stock supporting barrel 44. That portion of the supporting tube 276 which is adjacent to the leading end thereof is U-shaped so that the major portion of the tube length is disposed at one side of and parallel to the stock magazine. This parallel portion of the tube is slightly oversized and takes the form of a cylinder 278 in which is provided a piston 280 attached to the rear end of the flexible pusher cable 274. The cylinder 278 is of sufficient length so that movement of the piston 280 from the retracted position shown in Fig. 9 may be continued to enable the leading end of the cable to enter and to pass through the aligned barrel 44, and thereafter to enter and move through the length of the feed tube 270 and into engagement with the restricted forward end thereof. The cylinder 278 is provided at its rear end with a header 282 and at its forward end with a header 284. The flexible pusher cable 274 is provided at its forward end with a stock engaging element 288, see Fig. 10, which is mounted to rotate freely with relation to the cable and to yield to a limited extent axially with relation thereto. The member 288 is supported by means of a ball bearing 290 on the forward end of a plunger 292, housed for movement axially within a cylinder 294, being normally maintained in an extended position with relation thereto by means of a compression spring 296 seated at one end against the base of a cylinder and at its other end against the end of the plunger 292.

Figures 11, 12, 13:
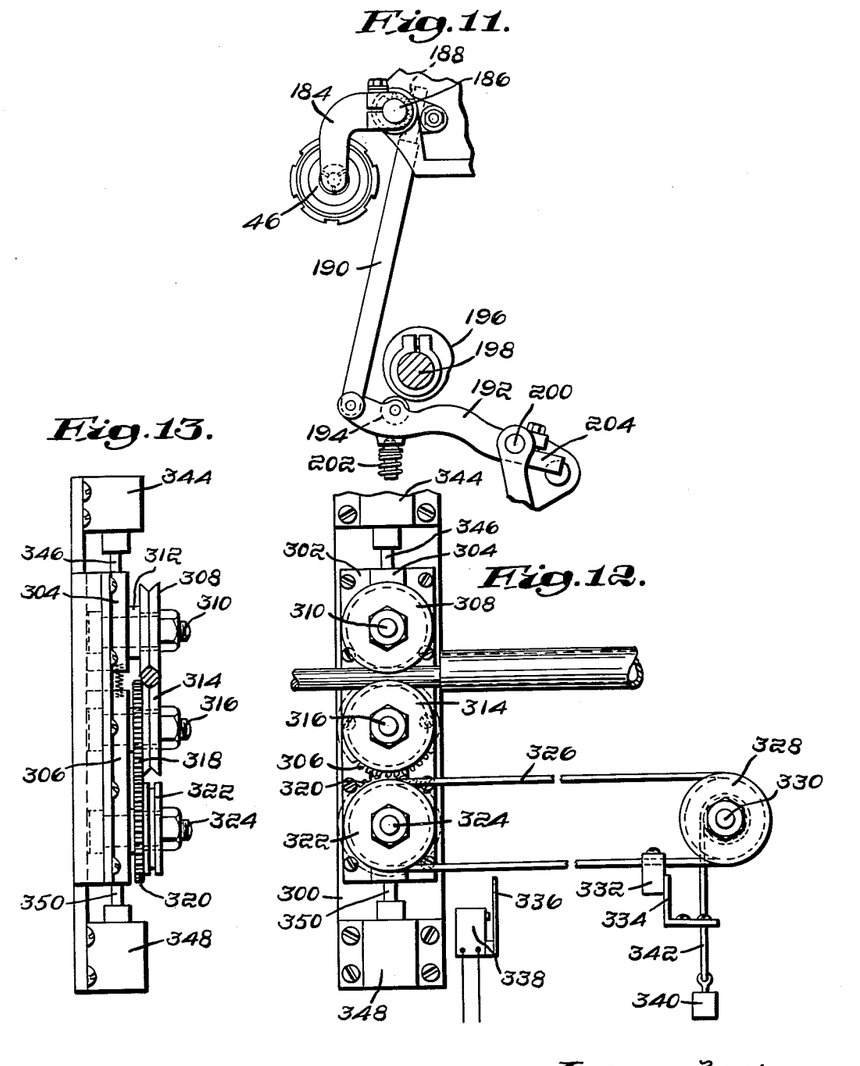
Fig. 11 is a detail sectional view in elevation of the stock stop and its actuating connections in an automatic screw machine.
Fig. 12 is an enlarged detail view in side elevation of the distance measuring rolls and endless belt shown in Fig. 9.
Fig. 13 is an end view of substantially the parts shown in Fig. 12.

In the modified form of the invention shown particularly in Figs. 9, 12, and 13, a novel bar positioning device is provided which is rendered operative by the passing of the leading end of a new bar of stock being fed from an aligned barrel 44 into the feed tube of the machine, and which acts after the feeding of a measured length of bar stock into the feed tube to throw the screw machine main clutch lever into its operating position, to return the stock stop to active operation, and to move the two bar engaging rollers which form part of the bar positioning device to a retracted inoperative position. The bar positioning device referred to, as best shown in Figs. 12 and 13, comprises a vertically disposed bracket 300 on which are mounted members 302 providing a track for a roller supporting block 304 disposed above the bar of stock feeding into the machine, and a second roller supporting block 306 disposed below the feeding bar. The block 304 provides support for a roller 308 having a V-shaped bar engaging peripheral surface. The roller 308 is supported to turn on a stud 310 having at its inner end an enlarged head which rides in a T-shaped slot provided by the track members 302. A spacer 312 on the stud serves to space the roller 308 from the block 304 in alignment with the feeding bar. The sliding block 306 similarly provides support for a roller 314 having a V-shaped bar engaging peripheral surface. The roller 314 is mounted on a stud 316 having at its inner end an enlarged head for engagement in a T-shaped slot provided by the plates 302. The roller 314 is connected to drive a pulley 322 mounted on a stud 324 on the block by means of two gears 318, 320 secured respectively to the under faces of the roller 314 and pulley 322. An endless strap 326 is supported on the pulley 322 and on a second pulley 328 carried on a stationary pivot 330. A dog 332 is mounted on the strap 326 and is arranged for movement therewith in one direction to limiting position in which the dog 332 engages a fixed stop 334 and in the opposite direction to a limiting position in which the dog engages the actuating arm 336 of a detector switch 338. The strap 326, and dog 332 are normally maintained in a retracted position in which the dog is engaged with the stop 334 by means of a weight 340 and a strap 342 which is coiled about the hub portion of the roller 328.

The two slides 304 and 306 are normally maintained in a relatively separated inoperative position by means of a coiled compression spring 343 interposed between the two slides. In order that the bar positioning device above described may be rendered operative to engage with and to control the further advance of the leading end of the new bar of stock into the screw machine, the two slides 304 and 306 are arranged to be moved together so that the feeding bar will be frictionally engaged by the rollers 308 and 314. The operating connections for the two slides comprise a compressed air cylinder 344 secured to the upper end of the bracket 300 with a piston 346 which is attached to the slide 304, and a compressed air cylinder 348 secured to the lower end of bracket 300 with a piston 350 which is attached to the slide 306. In the operation of the device the two slides are moved together when compressed air is supplied to the cylinders 344 and 348. As soon as the leading end of a new bar of stock comes into frictional engagement with the rollers 308, 314, the strap 326 is caused to advance until the dog 332 is brought into engagement with the detector switch 338, which will act through control devices hereinafter described to arrest the feed of the bar. Thereafter the rollers are again separated so that the strap 326 and dog 332 are permitted to return again to their retracted position under the influence of weight 340.

The actuating and control devices associated with the magazine loading device illustrated in Fig. 9 include the compressed air cylinder and piston unit 278 for actuating the pusher cable 274 and the roller actuating compressed air cylinders 344 and 348, together with a number of the compressed air cylinder and piston units more particularly described in connection with the embodiment of the invention shown in Fig. 1. These include the compressed air cylinder 62 for effecting the indexing movement of the magazine, the compressed air cylinder 150 for actuating the usual hand lever to stop the screw machine, the compressed air cylinder 222 for rendering the stock stop of the screw machine inoperative, and the compressed air cylinder 180 for shifting the screw machine starting and stopping lever again to the running position.

Figure 16:
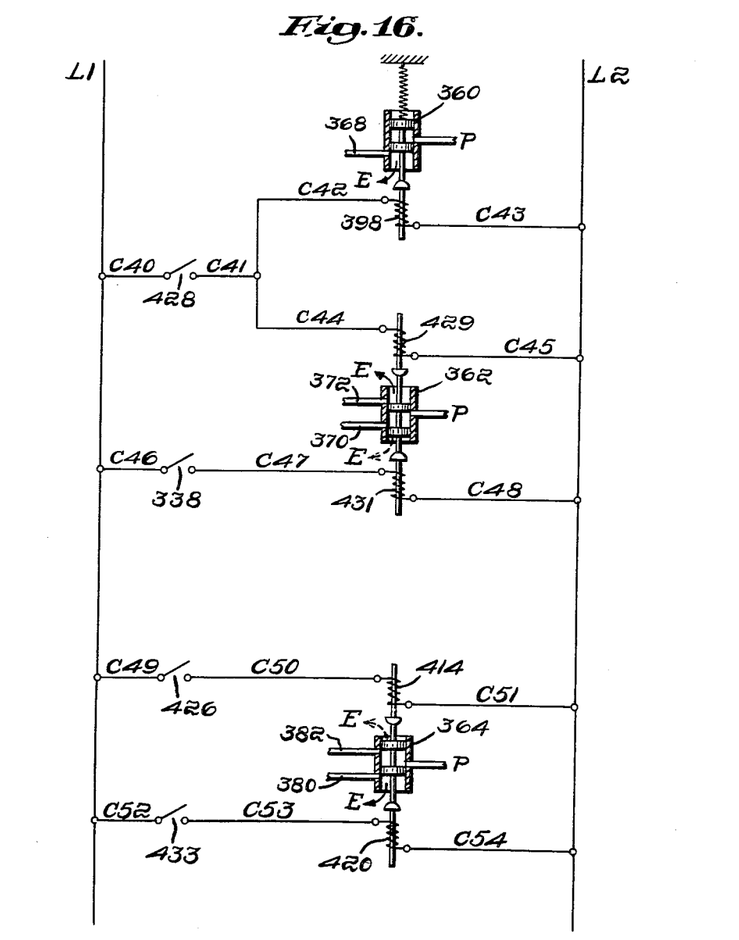
Fig. 16 is an elementary wiring diagram of the electrical connections shown in Fig. 9.

The flow of compressed air to each of the compressed air cylinder and piston units above described is controlled by means of a group of three solenoid operated compressed air valves shown diagrammatically in Figs. 9 and 16. The compressed air valves referred to comprise a single solenoid operated three-way spring return compressed air valve 360, a two-solenoid operated four-way compressed air valve 362, and a two-solenoid operated four-way compressed air valve 364. As best shown in Fig. 9, compressed air is admitted from the source of supply through an air pressure control valve 366 through a line marked P to the three-way compressed air valve 360 and thence through a pipe 368 to the compressed air indexing cylinder 62.

From the four-way compressed air valve 362 for one position of the valve, compressed air is admitted through a pipe line 370 to the machine start compressed air cylinder 180. For an alternative position of the valve 362, compressed air is admitted through a pipe 372 to the stock stop hold-out compressed air cylinder 222 and through an extension 374 to the machine stop compressed air cylinder 150. For this position of the valve 362 compressed air is admitted also through another extension 376 and an air pressure control valve 378 to the roller actuating compressed air cylinders 344 and 348. From the compressed air valve 364 air under pressure is admitted for one position of the valve through a pipe line 380 to the header 282 forming a base end of the pusher feed cylinder 278 and for the alternative position of the valve 364 is admitted through a pipe line 382 to the header 284 forming the leading end of the pusher feed cylinder 278.

Fig. 5 of the drawings discloses in an enlarged detail view the construction and arrangement of the compressed air valve 360 shown diagrammatically in Figs. 9 and 16. The valve comprises a valve body generally designated at 360 having the inlet or supply pipe marked P connected to one side of the valve body and the outlet pipe 368 connected to the opposite side of the valve body. Inside the valve body 360 there is provided an axially shiftable valve member 386 which is normally held in the shut-off position to the left as shown in Fig. 5 by means of a compression spring 388 coiled about a cylindrical portion of the valve body and seated against a cap 390 fastened to the outer end of the valve member. Intermediate its length the valve member 386 is provided with a reduced portion 392 which serves to control the flow of air through the valve. In the position shown, air in the pipe line 368 is permitted to escape by way of a port 394 and groove 392 in the valve member through an exhaust port formed by the open end of the valve body. When the valve member is moved to the alternative position to the right, the grooved portion 392 of the valve member will connect the supply port 396 of the valve body with the port 394 to supply compressed air through the pipe 368. Movement of the valve member to its operating position is controlled by a solenoid 398 having an armature 400 to which the valve member 386 is connected by pin 402.

Fig. 4 provides a detailed disclosure of the two-solenoid operated four-way valve 364 diagrammatically shown in Figs. 9 and 16. The valve body is designated at 364 having connected thereto an inlet pipe designated at P, and the two outlet pipes designated respectively at 380 and 382. The valve body is formed to receive an axially movable valve member 406 which is shiftable between two alternative positions in one of which compressed air is supplied to the pipe 382 while the pipe 380 is open to exhaust, this being the position shown in Fig. 4. In the alternative position compressed air is supplied to the pipe 380 and the pipe 382 is open to exhaust. The valve member 406 is provided with two annular grooves 408 and 410 which are arranged for the alternative positions of the valve to connect the two pipes 380 and 382 together with their respective valve ports 412, 414, alternately with the supply line P and supply port 412 and with exhaust. The position of the valve member 406 is controlled by means of two solenoids, including the solenoid 414 and armature member 416 connected by a pin 418 with the left hand end of the valve member, and a solenoid 420 and armature 422 connected by a pin 424 with the right hand end of the valve member.

The operation of the modified form of applicant's magazine and loading device shown in Figs. 9, 10, 12, 13, and 16 of the drawings will be particularly described with reference to Fig. 9 and the across-the-line electrical diagram of Fig. 16. It is assumed that the operation of feeding a bar of stock into the machine has been completed, that the machine has been conditioned for the ejection of the waste end of the bar in the machine, and that the rotary head 288 has engaged against the angle 425 of the feed tube 270 of the screw machine, causing the tube to be moved forwardly against the pressure of its spring 272 and the shouldered rear end of the feed tube to actuate a microswitch 426.

The main function of microswitch 426 is to start the return movement of the flexible cable pusher 276 to its initial starting position, in which the rotatable head 288 is withdrawn from the aligned barrel 44. The closing of the microswitch contacts $c49$—$c50$ energizes solenoid 414 which acts to move the four-way compressed air valve 364 to its reverse position. In this position of the valve compressed air is exhausted from the left hand end of the feed cylinder 278 through pipe line 380, and compressed air at the same time is admitted to the right hand end of cylinder 278 through pipe line 382 to start the retracting movement of the piston 280 and flexible cable 274.

When the piston 280 and the attached flexible cable 274 reach a fully retracted position, the piston 280 contacts the pin 427 slidably supported in the header 282 which in turn activates a microswitch 428. The operation of this switch causes the indexing mechanism of the machine to be rendered operative to position the next succeeding barrel 44 in alignment with the feed tube, to render the stock stop inoperative, to shift the main clutch lever 146 of the machine to stop position and to move the distance measuring rollers 308 and 314 together so that they will frictionally engage with the leading end of a new bar. Referring more specifically to Figs. 9 and 16, the closing of microswitch 428 comprising contacts $c40$—$c41$ causes solenoid 398 associated with the indexing compressed air valve 360 and a solenoid 429 associated with the four-way compressed air valve 362 to be energized. Air valve 360 is shifted to its "on" position so that compressed air is supplied through pipe 368 to the indexing cylinder 62 to index the bar stock magazine. Compressed air valve 362 under the influence of solenoid 429 is moved to the left so that compressed air is supplied to the pipe 372 and compressed air cylinder 222 to move the stock stop out of the way. Compressed air is supplied through valve 362, pipe 376, and pressure control valve 378 to the roller engaging compressed air cylinder 344 and 348 to move the rollers 308, 314 into bar engaging position. Compressed air is supplied through the valve 362 and extension 374 to the compressed air cylinder 150 in order to shift the main clutch lever 146 of the machine to a stop position.

As the indexing pawl 52 nears the limit of its advancing movement to position the next succeeding barrel 44 in alignment with the feed tube 270, the pawl is arranged to engage with and actuate a microswitch 433, which acts to start the feed of the pusher of the piston 280 and flexible pusher cable 274 to advance the newly aligned bar into the screw machine. The actuation of microswitch 433 closing contacts $c52$—$c53$ energizes solenoid 420, thus moving valve member 406 of four-way valve 364 to the feed position so that compressed air is admitted through pipe 380 to the header 282 at the base end of cylinder 278. At the same time the pipe 382 connected with the header 284 at the right hand end of the cylinder 278 is connected with exhaust. The advancing movement of piston 280 and flexible cable pusher 274, set in motion as above described, causes the leading end of the pusher to enter the newly aligned barrel 44 to engage with and advance the bar of stock stored therein.

Movement of the leading end of the new bar between the rolls 308 and 314 moved together as above set forth causes the strap 326 and dog 332 to be advanced along with the leading end of the new bar. When the bar has been advanced a measured distance into the desired position with relation to the face of the collet of the screw machine, the dog 32 contacts with microswitch 338 which acts to shift the main clutch lever of the machine to the running position, to permit the return of the stock stop to active operation, and to permit the movement of rollers 308 and 314 out of engagement with the feeding bar under the influence of their return spring 343. The actuation of microswitch 338 comprising switch contacts $c46$—$c47$ energizes a solenoid 431 reversing the position of the four-way compressed air valve 362 so that air is supplied through pipe 370 to compressed air cylinder 180 to shift the main clutch lever of the machine into operating position. This shifting movement of the valve 362 at the same time acts to exhaust air from each of the cylinders 344 and 348, 222, and 150 so that the rolls 308 and 314 are returned to their initial separated positions, the stock stop is returned to active operation, and the mechanism employed for moving the main clutch lever to stop position is rendered inoperative.

Figure 14:
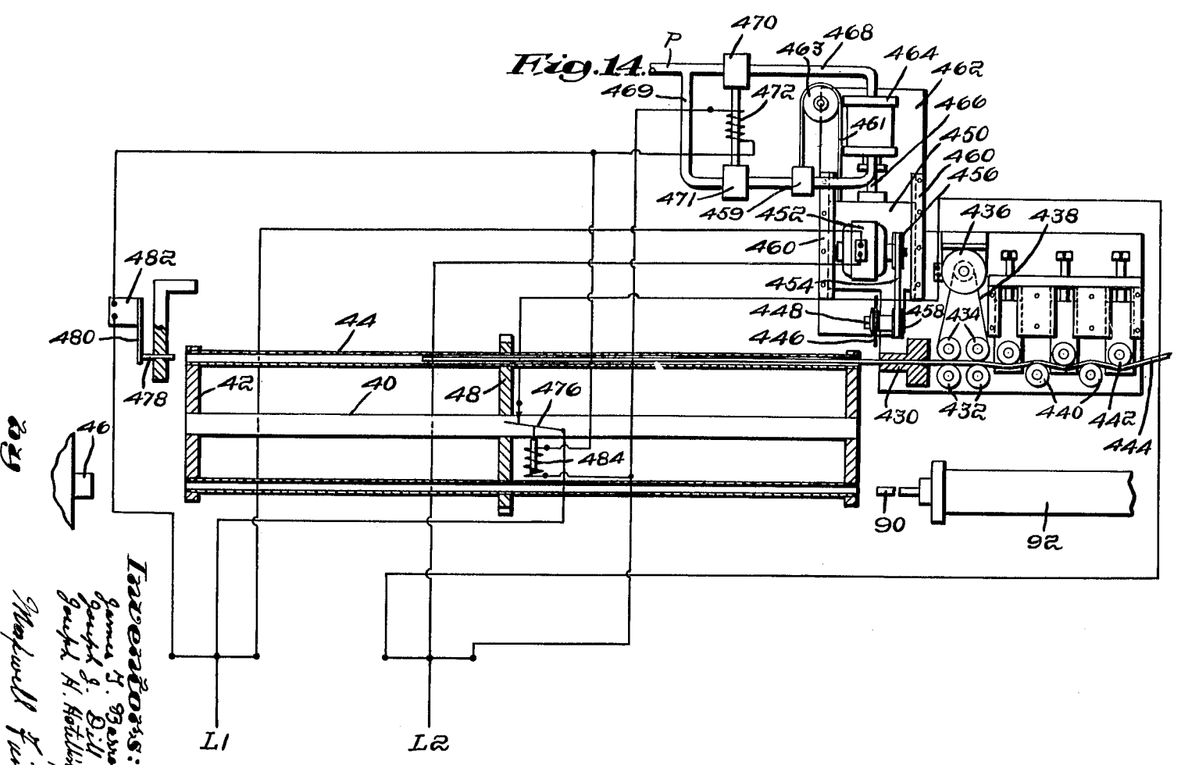
Fig. 14 is a diagrammatic view in elevation of the loading device as shown in Fig. 1 but with the addition of a mechanism for automatically feeding from a stock reel and for cutting off lengths of bar stock positioned in the magazine barrels.

Fig. 14 of the drawings discloses a further modification of the invention in which there is added a mechanism for automatically reloading one barrel 44 at a time of the magazine loading device following the discharge of the bar of stock stored in another of the barrels into the operating machine. The reloading device disclosed in Fig. 14 is of the general type adapted to draw bar stock from a reel, to straighten the stock, and to deliver it in straightened condition to the desired location. The arrangement of the rotary magazine loading device, shown in Fig. 14, is in many respects similar to that shown in Figs. 1 to 8, 11, and 15, including the bar stock supporting barrels 44 arranged in a circular relation, the central pivot shaft 40, supporting discs 42 and centrally disposed ratchet disc 48, including the supporting and actuating connections particularly illustrated for example in Fig. 3. The pusher rod 90 and cylinder 92 correspond with similar parts in Fig. 1. The work spindle of the screw machine into which the bar stock is fed is generally indicated at 46.

The reel type automatic loader shown in Fig. 14 comprises generally a guide tube 430 through which bar stock is projected into one of the more upwardly disposed barrels of the magazine. This mechanism comprises a bar feeding device having two stationary rollers 432 and two rollers 434 arranged to be driven from a motor 436 by means of a belt 438, and a group of straightening rollers 440, 442, which are disposed on opposite sides of the feeding bar stock in slightly overlapping relation so that the feeding bar is subjected to a series of bending movements which in the aggregate have the effect of restoring the bar to a fully straightened condition. It is understood that the bar stock 444 being fed through the rollers and guide tube 430 above described is a continuous strip material, and is drawn from a reel which may be of ordinary description and is not here shown. The reel loading mechanism shown in Fig. 14 further comprises a cutting-off device in the form of a circular saw 446 which is mounted on a shaft 448 carried on a vertically movable slide 450. The shaft 448 and saw 446 are arranged to be driven from an electric motor 452 mounted on the slide 450 by means of a driving belt 454 and pulleys 456 and 458. The slide 450 is mounted for movement in a vertical plane in a guideway 460 formed on a vertically arranged bracket 462. The slide is normally held in a raised position by a counterbalancing weight 459 and connecting strap 461 which rides over a pulley 463. The slide 450 is moved downwardly in order to cause the saw 446 to sever the bar by means of a compressed air cylinder and piston unit comprising a cylinder 464 mounted on the bracket and a cooperating piston 466 which is connected to the slide 450. Compressed air is supplied to opposite ends of the piston 464 through a pipe line 468 and pipe line 469 by means of two solenoid actuated three-way valves 470, 471, which may be similar to those previously described. Compressed air is supplied to the valves through a pipe marked P. The valves are controlled by means of a spring return solenoid 472, the arrangement being such that when the solenoid is energized the valve 470 is conditioned to supply compressed air to the piston 464 to depress the slide and valve 471 is connected to exhaust. When the solenoid 472 is again de-energized, the valve 470 moves to its "off" position in which air is exhausted from the upper end of cylinder 464 and valve 471 moves to its "on" position so that compressed air is supplied to the lower end of cylinder 464 to return the slide 450 and saw 446 to the raised inoperative position of Fig. 14.

The reel type automatic loader of Fig. 14 is arranged to be automatically controlled through electrically operated devices which act when an indexing movement of the magazine takes place to start the feed of bar stock into an aligned barrel 44, and when the desired length of bar has been fed into the barrel to arrest the feed of the bar stock and to move the saw 446 into position to cut off the bar from the supply.

The electrical connections for controlling the operation of the reel loader comprise the electrical supply lines L1, L2 and three parallel electric circuits therefrom including lines c60, c61, c62 connecting with the solenoid 472 lines c65, c66 and c67 connecting with the feed motor 436 and lines c68, c69 connecting with the saw motor 452.

Figure 17:
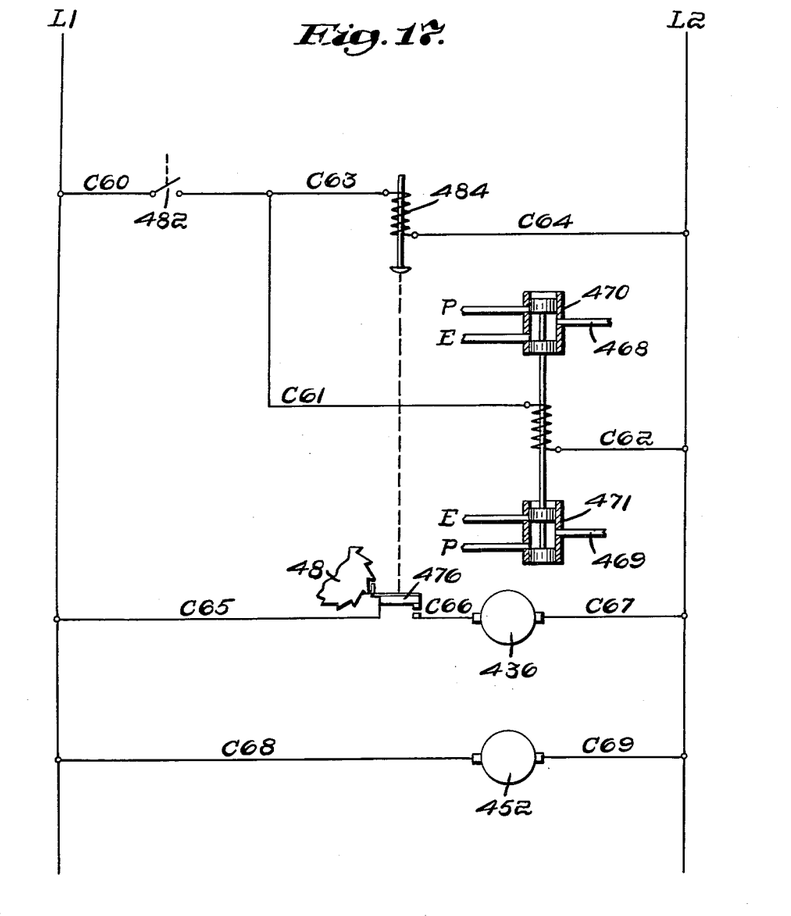
Fig. 17 is an elementary wiring diagram of the electrical connections shown in Fig. 14.

The operation of the automatic loader of Figs. 14 and 17 is as follows: The indexing movement of the ratchet wheel 48 is employed to start the operation of feeding bar stock from a continuous strip into an empty barrel 44. An indexing movement of the ratchet wheel 48 causes a tooth of the ratchet to engage with, and move a switch arm 476 to its closed position, thus closing the circuit through line c65, c66, c67 to the feed motor 436. When the leading end of the feeding bar stock has passed entirely through the barrel 44, it is arranged to engage with a detector device including a contact pin 478, a switch arm 480, and a microswitch 482 connected in series with solenoid 472, thus closing switch contacts c60—c61 to energize solenoid 472. Compressed air valves 470, 471 are shifted so that compressed air is supplied through pipe line 468 to the upper end of cylinder 464 to depress slide 450 and saw 446 into cutting position. It will be understood that the saw motor 452 is continuously driven through the circuit leads c68, c69. At the same time that the cutting off operation takes place, a solenoid 484, electrically connected by wires c63, c64, parallel to the solenoid 472 and having an operating connection to the indexing control switch arm 476, is energized to return the switch arm 476 to its open position, thus de-energizing the feed motor 436 to discontinue the feed of the bar stock from the storage reel. Upon the next indexing movement of the magazine, the bar engaged against the contact pin 478 is removed therefrom permitting the microswitch 482 to return to its open position, thus de-energizing the solenoid 472. Compressed air valves 470, 471 are then returned by means of the usual solenoid return spring to the initial position shown in Fig. 17, causing air to be exhausted from the upper end of the cylinder 461 through pipe 468, and to be supplied under pressure through pipe 469 to the lower end of cylinder 464 to return the slide 450 and saw 446 to the raised inoperative position of Fig. 14.

The term "barrel" as used in the specification and claims is intended to refer to an individual support of any description on which a bar of stock is mounted to be advanced into the work spindle of an automatic screw or similar machine. The term "magazine" as employed in the specification and claims is intended to refer to a plurality of such barrels and the supporting means which may be of any description on which the barrels are movably supported to be brought successively into alignment with the work spindle.

It will be understood that the invention is not limited to the specific embodiments shown, and that various deviations may be made therefrom without departing from the spirit and scope of the appended claims.

What is claimed is:

1. A loading device for automatic screw and similar machines, having a work spindle through which bar stock is fed, having in combination, a feed tube for the bar stock within the spindle arranged for a limited axial movement relative to the spindle, spring means normally maintaining the feed tube in a relatively retracted position, a bar stock supporting barrel aligned with the work spindle, and a pusher device for advancing a bar of stock from the barrel and for feeding the bar through the work spindle comprising a pusher member constructed and arranged to advance a bar from an aligned barrel into the work spindle and to feed successive increments of the bar to the machine, said pusher and feed tube being further constructed and arranged so that movement of the pusher into the feed tube causes the pusher to engage and move the feed tube axially against its spring, and actuating means for advancing and for withdrawing the pusher member including a device rendered operative by the movement of the feed tube to reverse the direction of movement of the pusher member.

2. A loading device for automatic screw and similar machines having a work spindle through which bar stock is fed, having in combination, a magazine for bar stock comprising a plurality of bar stock supporting barrels, actuating means for the magazine to move the barrels successively into indexed position in alignment with the work spindle, a pusher device comprising a pusher member constructed and arranged to advance a bar from an aligned barrel into the work spindle and to feed successive increments of the bar to the machine, means for advancing the pusher member into the work spindle to the substantial exhaustion of the feeding bar and for withdrawing the pusher member to a position removed entirely from the aligned barrel, and control devices including a control element actuated by contact with the leading end of the pusher member when advanced to a predetermined position within the work spindle to retract the pusher, and a separate controller actuated by movement of the pusher to a withdrawn position removed entirely from the aligned barrel in an automatic sequence to move a succeeding barrel into indexed position and thereafter to advance the pusher.

3. A loading device for automatic screw and similar machines having a work spindle through which bar stock is fed, and a run and stop control for the machine, having in combination, a magazine for bar stock including a plurality of bar stock supporting barrels movable successively into indexed position in alignment with the work spindle, actuating mechanism for moving said barrels successively into said indexed position, a pusher device for feeding a bar of stock from an aligned barrel through the work spindle which comprises a pusher member of a length to be projected through the barrel into the work spindle, a cover into which the pusher member is withdrawn entirely from the aligned barrel, means for advancing the pusher member to feed the work and for returning the pusher member to said fully withdrawn position, a device responsive to the movement of the leading end of a new bar through the work spindle, and actuating and control devices rendered operative by engagement with the leading end of the pusher in an advanced limiting position to initiate the return movement thereof, by the return movement of the pusher to its fully withdrawn position to index the magazine, by said indexing movement to initiate the feeding movement of the pusher and to move said machine control element to the stop position, and by said device responsive to movement of the leading end of the new bar to shift said machine control element to the run position when the bar reaches a predetermined position in the work spindle.

4. A loading device for screw and similar machines having a work spindle through which bar stock is fed, and a control for starting and stopping the machine, having in combination, a bar stock supporting barrel aligned with the work spindle, a pusher device comprising a pusher member arranged to follow the feeding bar substantially the length of the barrel and work spindle to the exhaustion of the feeding bar, means for advancing the pusher to feed successive increments of the bar into the machine and for withdrawing the pusher, control means rendered operative upon the return movement of the pusher to its withdrawn position for actuating said machine control to stop the machine, a frictionally operated measuring device disposed between the barrel and work spindle for frictional engagement with the leading end of a new bar, and connections controlled thereby following a measured advance of the leading end of a new bar into the work spindle to move the machine control to run position.

5. A loading device for automatic screw and similar machines having a work spindle through which bar stock is fed, a machine control for starting and stopping the machine, and a stock stop movable into and out of the stock stop position, having in combination, a bar stock supporting barrel aligned with the work spindle, a feeding device comprising means for advancing a bar of stock from the barrel into the work spindle and for feeding successive increments of the bar against the stock stop in the machine, control means rendered operative automatically upon exhaustion of the feeding bar to move said pusher member to a withdrawn position, a control element actuated by the withdrawing movement of said pusher member for actuating said machine control to stop the machine and to move the stock stop from the stock stop position, a measuring device disposed adjacent the work spindle and arranged to be acted upon by the leading end of a new bar entering the work spindle, and connections controlled by said measuring device rendered operative following a measured advance of the leading end of the new bar into the work spindle to move the machine control to run position and to permit the return of the stock stop to the stock stop position.

6. A loading device for automatic screw and similar machines having a work spindle through which bar stock is fed, a machine control for starting and stopping the machine and a stock stop movable into and out of the stock stop position, having in combination, a magazine for bar stock comprising a plurality of bar stock supporting barrels, a fluid pressure actuated magazine control device for moving the barrels successively into indexed position in alignment with the work spindle, a pusher device movable the length of the aligned barrel into the work spindle for advancing a bar of stock from the barrel into the work spindle and for feeding successive portions of the bar into the machine, a fluid pressure actuated device for advancing and for retracting the pusher to a position withdrawn entirely from the aligned barrel, fluid pressure actuated devices for shifting the machine control between start and stop position and for moving the stock stop into and out of operating position, a magazine fluid pressure control valve, a pusher fluid pressure control valve and a machine and stock stop fluid pressure control valve, and electrical control means for actuating said valves including a switch actuated by the advancing movement of the pusher to initiate the withdrawal of the pusher, a switch actuated by movement of the pusher to its fully withdrawn position to actuate the magazine, a switch rendered operative upon actuation of the magazine to stop the machine and to move the stock stop out of the stock stop position, and a switch rendered operative by the advancing movement of the leading end of the new bar to start the machine and to permit the return of the stock stop to the stock stop position.

7. A loading device for automatic screw and similar machines having a work spindle through which bar stock is fed and a control for starting and stopping the machine, having in combination, a bar stock supporting barrel aligned with the work spindle, a pusher device comprising a pusher member movable the length of the aligned barrel into the work spindle to advance a bar from the barrel into the work spindle and to feed successive increments of bar stock to the machine, means for advancing and for withdrawing the pusher, fluid pressure operated means for operating said machine control to start and stop the machine, a device for measuring the advance of the leading end of a bar into the work spindle comprising a friction roller movable into and out of engagement with the feeding bar, a dog and connections from the friction roller for moving the dog, fluid pressure actuated means for moving the friction roller into and out of bar engaging position, and valve means operative upon the advance of the pusher member for directing fluid pressure to move said roller to the engaging position and to stop the machine and by movement of the dog to a predetermined position, for directing said fluid pressure to permit said rollers to be disengaged and to start the machine.

References Cited in the file of this patent

UNITED STATES PATENTS

| | | |
|---|---|---|
| 1,198,797 | Waterman | Sept. 19 1916 |
| 1,489,984 | Datisman et al. | Apr. 8, 1924 |
| 1,954,964 | Tessky | Apr. 17, 1934 |
| 2,320,039 | Jobert | May 25, 1943 |
| 2,331,953 | Andrews et al. | Oct. 19, 1943 |
| 2,351,962 | Harrison | June 20, 1944 |
| 2,548,786 | Harney | Apr. 10, 1951 |
| 2,602,212 | Rosenberg | July 8, 1952 |

FOREIGN PATENTS

| | | |
|---|---|---|
| 571,614 | Germany | Feb. 9, 1933 |
| 188,669 | Switzerland | Apr. 16, 1937 |